(12) United States Patent
Stephenson et al.

(10) Patent No.: US 10,909,973 B2
(45) Date of Patent: Feb. 2, 2021

(54) INTELLIGENT FACILITATION OF COMMUNICATIONS

(71) Applicant: INTERNATIONAL BUSINESS MACHINES CORPORATION, Armonk, NY (US)

(72) Inventors: Martin Stephenson, Ballynacargy (IE); Joao Bettencourt-Silva, Dublin (IE); Elizabeth Daly, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/240,372

(22) Filed: Jan. 4, 2019

(65) Prior Publication Data
US 2020/0219489 A1  Jul. 9, 2020

(51) Int. Cl.
| | | |
|---|---|---|
| G10L 15/18 | (2013.01) |
| G10L 25/63 | (2013.01) |
| G10L 15/22 | (2006.01) |
| G06N 20/00 | (2019.01) |

(52) U.S. Cl.
CPC ......... *G10L 15/1815* (2013.01); *G06N 20/00* (2019.01); *G10L 15/22* (2013.01); *G10L 25/63* (2013.01)

(58) Field of Classification Search
CPC ... G10L 15/1815; G10L 15/22; G10L 15/187; G10L 13/00; G10L 13/02; G10L 15/02; G10L 15/18; G10L 15/1822; G10L 15/005; G10L 15/183; G10L 25/63; G10L 15/26; G06N 20/00; G06N 3/0445; G06F 40/42; G06F 40/30; G06F 40/232
See application file for complete search history.

(56) References Cited

U.S. PATENT DOCUMENTS

| | | |
|---|---|---|
| 4,980,917 A | 12/1990 | Hutchins |
| 6,714,911 B2 | 3/2004 | Waryas et al. |
| 9,218,333 B2 | 12/2015 | Liensberger |
| 2006/0136223 A1 | 6/2006 | Brun et al. |
| 2014/0067730 A1 | 3/2014 | Kozloski et al. |
| 2014/0122062 A1* | 5/2014 | Zangvil ................ G06F 40/263 704/9 |
| 2014/0297252 A1* | 10/2014 | Prasad .................... G10L 15/01 704/2 |

FOREIGN PATENT DOCUMENTS

WO   2010013228 A1   2/2010

OTHER PUBLICATIONS

J. Adams, "Target word prediction and paraphasia classification in spoken discourse." Proceedings of the BioNLP 2017 workshop, pp. 1-8, Vancouver, Canada, Aug. 4, 2017.

(Continued)

*Primary Examiner* — Yogeshkumar Patel
(74) *Attorney, Agent, or Firm* — Griffiths & Seaton PLLC

(57) ABSTRACT

Embodiments for intelligent facilitation of communication by a processor. A communication error in one or more selected portions of a communication of a user may be identified. The communication error in the one or more selected portions of the communication may be automatically translated.

20 Claims, 9 Drawing Sheets

(56) References Cited

OTHER PUBLICATIONS

Anonymous, "Context-sensitive personal speech completion aid." IP.com Disclosure No. IPCOM000236313D, Electronic Publication Date: Apr. 18, 2014.
H. Chinaei, "Identifying and avoiding confusion in dialogue with people with Alzheimer's disease." Comput. Linguist. 43, 2 (Jun. 2017), 377-406.
D. Le, "Automatic Paraphasia Detection from Aphasic Speech: A Preliminary Study," Interspeech 2017, Aug. 20-24, 2017, Stockholm, Sweden, pp. 294-298.
Anonymous, "System to detect pain in patients who can't express themselves," IP.com No. IPCOM000234008D, IP.com Electronic Publication Date: Jan. 7, 2014.
F. Rudzicz, 2014. "Automatically identifying trouble-indicating speech behaviors in Alzheimer's disease." In Proceedings of the 16th international ACM SIGACCESS conference on Computers & accessibility (ASSETS '14). ACM, New York, NY, USA, 241-242.
Rohit Prasad et al., Active Error Detection and Resolution for Speech-to-Speech Translation International Workshop on Spoken Language Translation. Raytheon BBN Technologies. Dec. 2012 (27 pages).
Satoshi Kaki et al., "A Method for Correcting Errors in Speech Recognition Using Statistical Features of Character Co-occurrence"ATR InterpretingTelecommunicationsResearchLabs, Hikaridai 2-2 Seika-cho,Soraku-gun,Kyoto 619-0288,Japan. Aug. 1998 (5 pages).
Youssef Bassil, Mohammad Alwani, "Post-Editing Error Correction Algorithm for Speech Recognition using Bing Spelling Suggestion" International Journal of Advanced Computer Science and Applications, vol. 3, No. 2, 2012 (7 pages).

\* cited by examiner

INTELLIGENT FACILITATION OF COMMUNICATIONS

BACKGROUND OF THE INVENTION

Field of the Invention

The present invention relates in general to computing systems, and more particularly to, various embodiments for intelligent facilitation of communication by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between people. For example, social media applications allow users to reach a large number of other persons, on a worldwide basis, that once was reserved for mass printed publications such as newspapers.

SUMMARY OF THE INVENTION

Various embodiments for intelligent facilitation of communication for a user by a processor, are provided. In one embodiment, by way of example only, a method for implementing intelligent facilitation of communication between parties for enhancing and facilitating mutual understanding, again by a processor, is provided. A communication error in one or more selected portions of a communication of a user may be identified. The communication error in the one or more selected portions of the communication may be automatically translated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
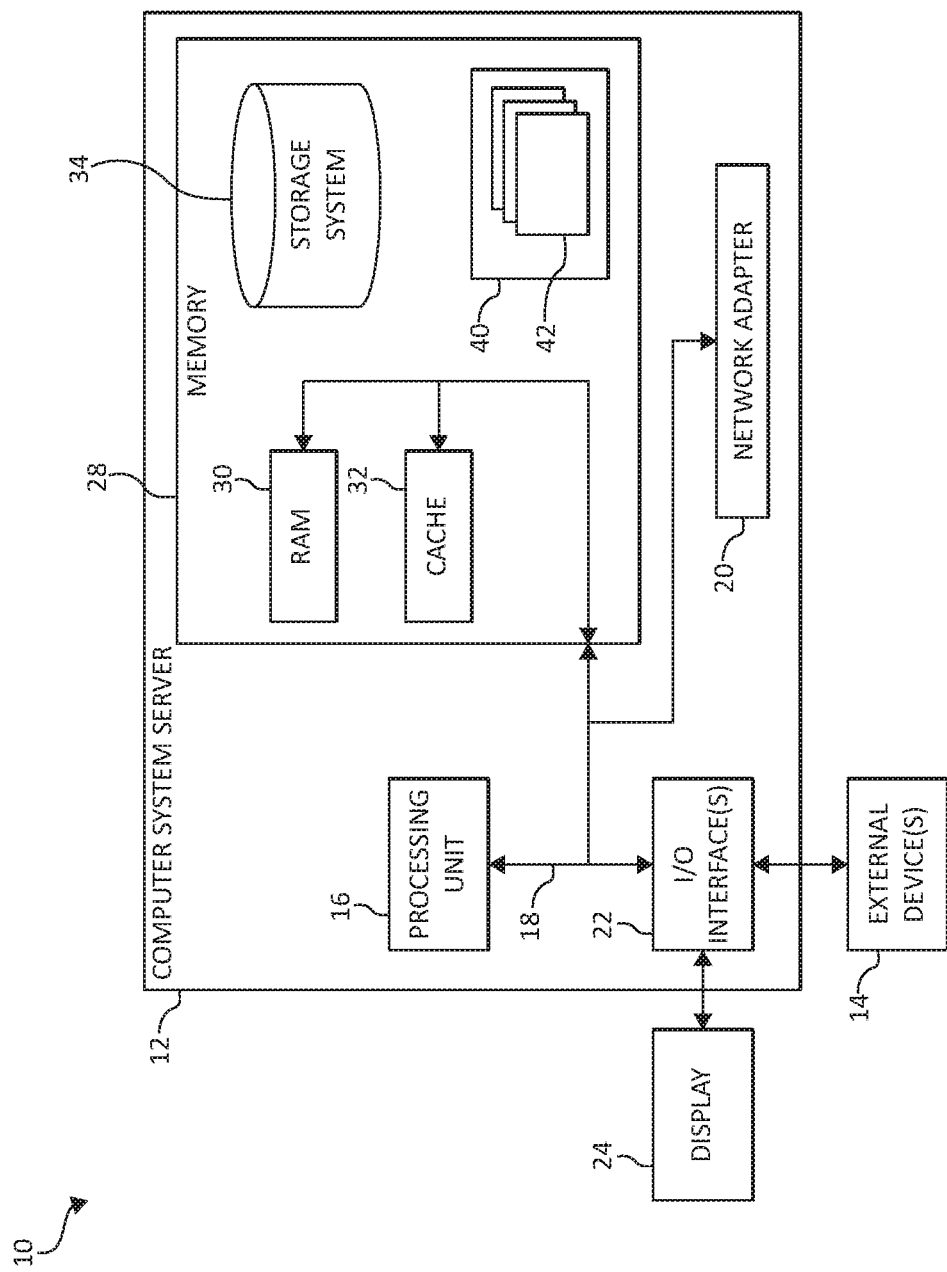
FIG. 1 is a block diagram depicting an exemplary cloud computing node according to an embodiment of the present invention.

In today's interconnected and complex society, computers and computer-driven equipment are more commonplace. Processing devices, with the advent and further miniaturization of integrated circuits, have made it possible to be integrated into a wide variety of personal, business, health, home, education, entertainment, travel and other devices. Communication is further enhanced and improved by computers and wireless communication devices. Communications, such as media data (e.g., audio/video), emails, messages, speeches, social media posts, and other content may be provided to one or more users.

However, providers and recipients of speech/communications may experience a variety of communication challenges, cognitive difficulties, language barriers, and/or health related learning and communication disabilities. For example, sensory, perceptual, cognitive and/or emotional response challenges in individuals may be associated with a neural dysfunction. For example, a communication disorder may cause interference with the ability to process language, select words, and organize the selected words in accordance with one or more syntax rules to form sentences according to an intended meaning in the communication. As an additional example, various dialects, cultures, or regions of a particular location may cause or influence the use of different words/phrases, jargon, alternative sounds, accents, speech patterns, or even use different syntax/grammatical rules for communication by a user, which may cause misunderstanding or miscommunication. Alternatively, a person skilled in speaking multiple language may use, mix, or alternate between different languages without realizing the recipient of the communication does not speak or understand the language. Moreover, a person may be challenged with a cognitive dysfunction and/or impairment in the context of incorrect speech patterns.

Accordingly, the present invention provides for intelligent facilitation of communication between a user and another party so as to enable all communication to an acceptable level of understanding between the user and the other party such as, for example, a user experiencing a cognitive dysfunction and/or impairment in the context of incorrect speech patterns. In one aspect, intelligent facilitation of communication between parties may be provided for enhancing and facilitating mutual understanding. A communication error in one or more selected portions of a communication of a user may be identified. The communication error in the one or more selected portions of the communication may be automatically translated/interpreted. That is, a communication error that may be identified according to one or more contextual factors, user profiles, knowledge domain/ontology may be identified. The communication error may be determined or identified using machine learning. The communication error may be corrected according to an appropriateness of communication (based on the contextual factors and users involved in the communication dialog) using a machine learning operation.

In one aspect, one or more parts of speech (e.g., word or phrases) may be collected and/or received (e.g., "input"). The parts of speech may be classified into one or more communication error categories. One or more possible interpretations of the communication errors may be interpreted/translated. For example, the word "gat" spoken by a user may be interpreted as "cat" or the word "wedding" may be translated/interpreted as "ring" according to the context of the current communication. One or more temporal patterns of errors may be monitored, learned, and/or analyzed to detect a shift in activity and a potential decline in a health state or condition of one of the parties to the communication. In one aspect, the temporal patterns may be when a user is one or more mistakes (e.g., incorrect speech/communication errors) over a defined period of time and indicating a decline in cognitive state of the user and/or a user experiencing a decline in a neurological state (e.g., a neurological syndrome such as, for example, aphasia which is the loss of ability to understand or express speech).

The communication error categories may include 1) use of incorrect words, incorrect pronunciation, or misunderstand/comprehension, 2) sound errors in speech, 3) semantic substitutions, such as saying aunt instead of sister, 4) describing a word that cannot be remembered, 5) repetition of words or phrases said by another person, and/or 6) repetition of meaningless words or phrases. Other communication error categories/sub-categories may be defined such as, for example, a use of mixed language category/sub-category (e.g., the phrase Bonjour, my friend," which is the user of the French language and the English language, etc.), a dialect category/sub-category (e.g., a particular form of a language that is peculiar to a specific region or social group, or other user defined category or sub-categories).

The so-called "appropriateness" of communication, such as a part of speech, may be very subjective and context dependent particularly when a person communicates with a person afflicted with a neural dysfunction. The same message may be interpreted and evaluated to be either "appropriate," "inappropriate," "suitable," "non-suitable," "proper," or even "improper," depending on who (subject) says to whom (object), when and where (context). In other words, the content of communication itself may not be inappropriate; rather the context of the communication becomes important as questions of to whom the communication is directed, who the communication is from, who may view the communication, where the communication is sent, and when the communication is sent.

Accordingly, the so-called "appropriateness" of a particular communication may depend greatly upon contextual factors, such as a subject-object relationship, and other contextual factors such as, for example, the communication error category, user profile, health state of a user (e.g., a user experiencing cognitive challenges, etc.), language skills (e.g., ability to speak/communicate/understand multiple languages), communication speed, communication tone, patterns of communication, communication/social skills, neural dysfunction, or other sensory, perceptual, cognitive and/or emotional/behavioral challenges, disabilities, or dysfunctions. A deeper, cognitive analysis of the communication is needed, for example based on standards, rules, and practices relating to persons with these various challenges.

In one aspect, the interpreted/translated communications may be enhanced (e.g., modified and/or polished according to learned appropriateness) based on reaction to the customized communications by the user, a caregiver of the user, or a combination thereof. The present invention may learn and recognize any communication of a dialog interaction with individuals having sensory, perceptual, cognitive and/or emotional/behavioral challenges, disabilities, or dysfunctions that may be misunderstood, incomprehensible, inappropriate, improper, intolerable, incorrect, and/or misinterpreted according to the persons involved in the conversation and one or more contextual factors. The present invention may filter, interpret, translate, update, correct, modify, and/or remove those sections, segments, or portions of the communication.

In addition, the mechanisms of the illustrated embodiments provide advice or suggestions to a communicator involved in a dialog. For example, the guidance may include indicating or suggestion to a communicator how to appropriately communicate. For example, the guidance/suggestions may indicate "the user only understands English. Please do not use the French language." Alternatively, the guidance/suggestions may suggest that the sound of the word "gat" was misunderstood by the recipient of the communication and the word "gat" will be translated/corrected to "cat."

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of emotions and/or behaviors, leading to a "learning" of one or more events, operations, or processes. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

In an additional aspect, the knowledge domain may be an ontology of concepts representing a domain of knowledge. A thesaurus or ontology may be used as the domain knowledge and may also be used to associate various characteristics, attributes, symptoms, behaviors, sensitivities, parameters, clinical diagnoses and treatments of an individual afflicted with autism or person having any sensory, perceptual, cognitive, emotional/behavioral challenges, disabilities, or dysfunctions (e.g., neural dysfunction), and/or any other difficulties in communicating or engaging in social interaction with other persons. In one aspect, the term "domain" is a term intended to have its ordinary meaning. In addition, the term "domain" may include an area of expertise for a system or a collection of material, information, content and/or other resources related to a particular subject or subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
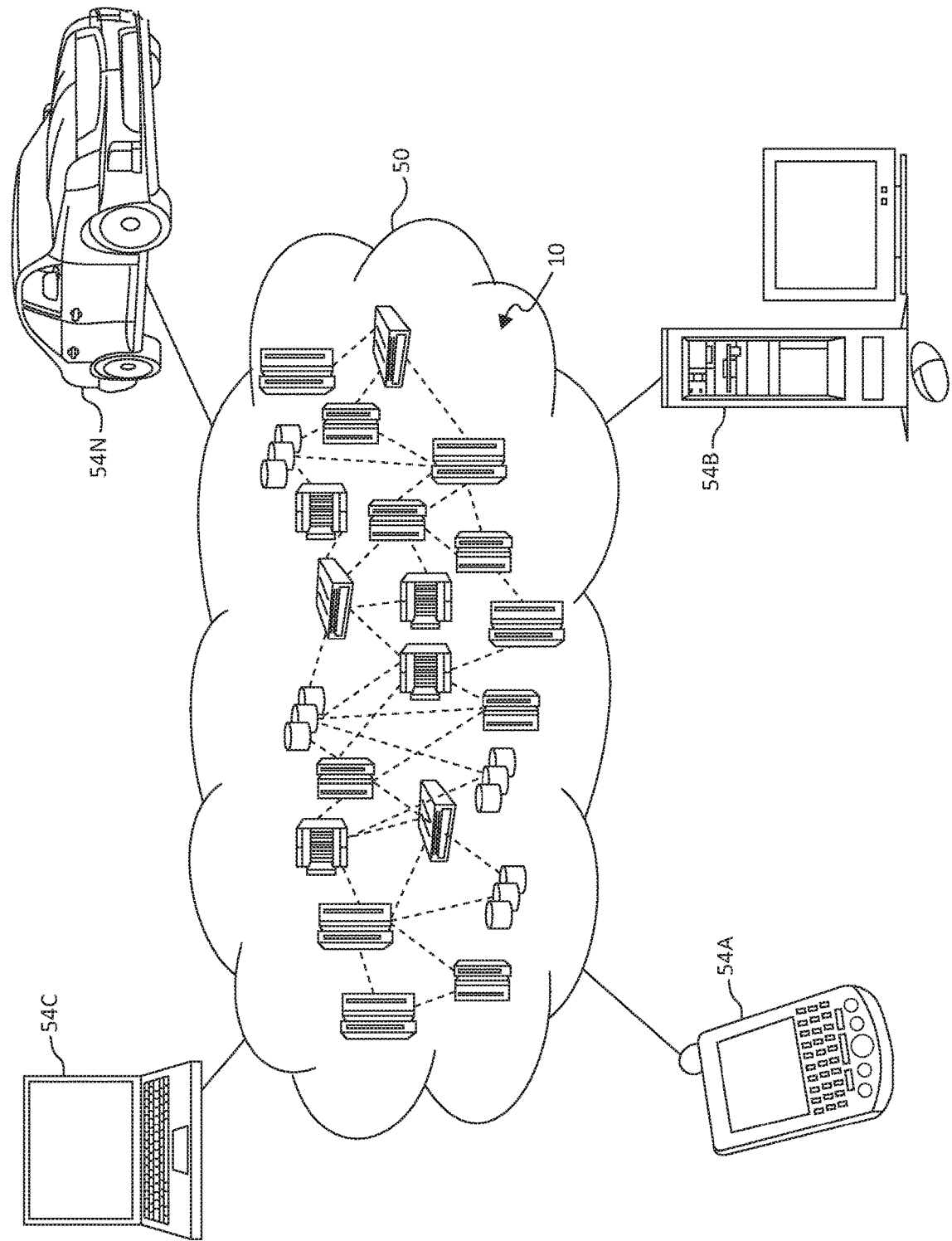
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
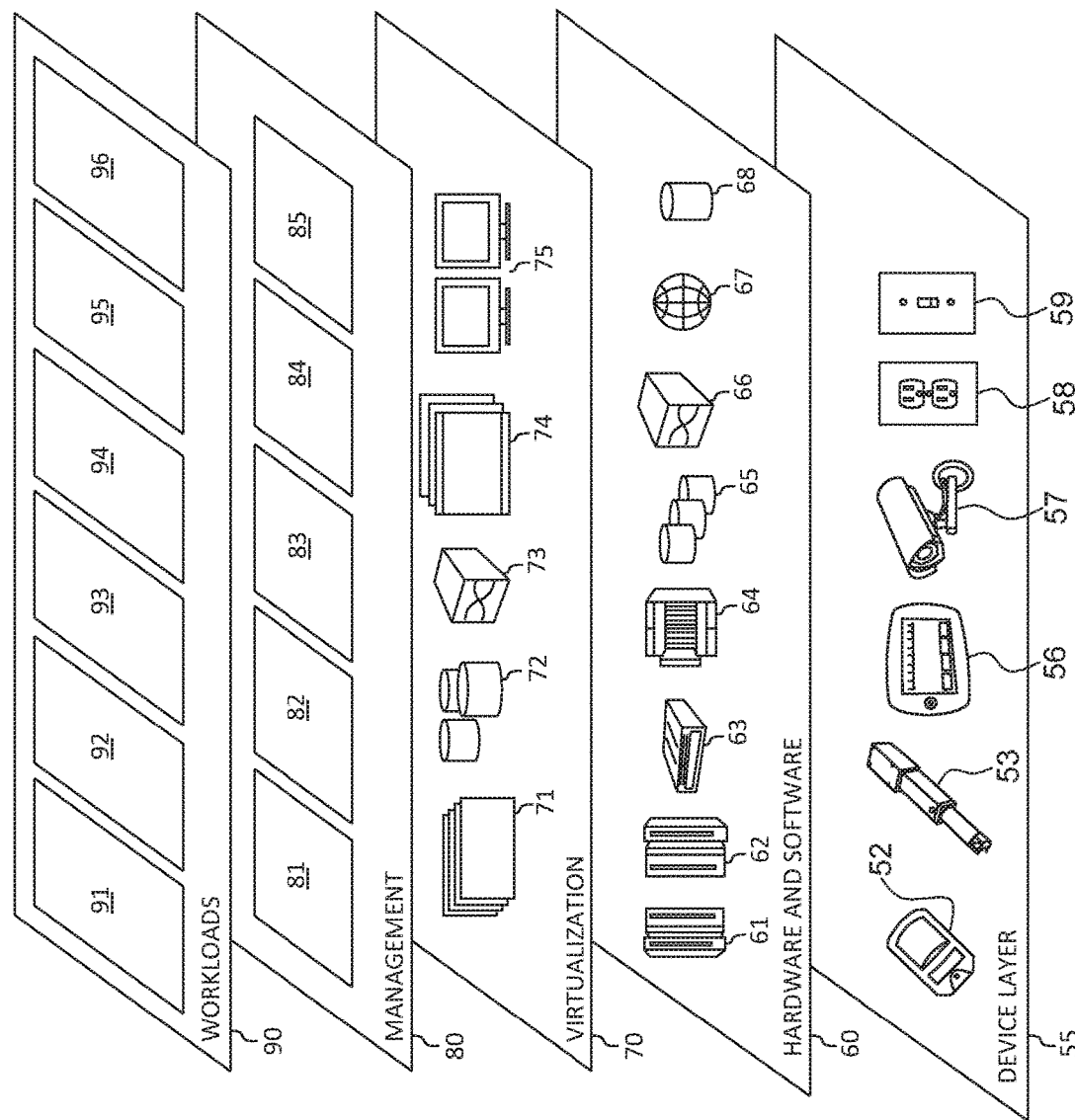
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various communication processing and facilitation workloads and functions 96. In addition, communication processing and facilitation workloads and functions 96 may include such operations as data analytics, data analysis, and as will be further described, notification functionality. One of ordinary skill in the art will appreciate that the communication processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the intelligent facilitation of communication between parties. A communication error in one or more selected portions of a communication of a user may be identified using a machine learning operation. The communication error in the one or more selected portions of the communication may be automatically translated using a machine learning operation. A decline of the health state of a user may be detected as the speech deteriorates over a selected period of time.

Figure 4:
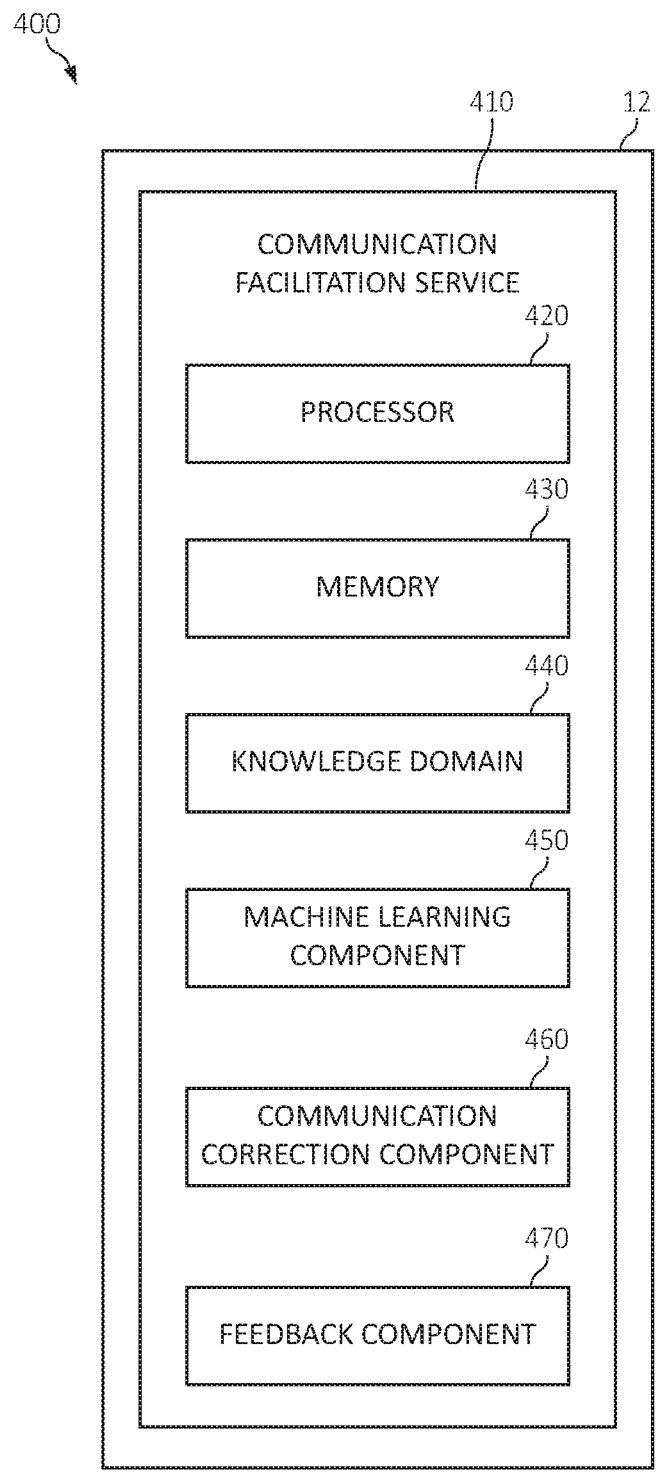
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A communication facilitation service 410 is shown, incorporating processing unit 420 to perform various computational, data processing and other functionality in accordance with various aspects of the present invention. The communication facilitation service 410 may be provided by the computer system/server 12 of FIG. 1. The processing unit 420 may be in communication with memory 430. The communication facilitation service 410 may include a knowledge domain 440, a machine learning component 450, a communication correction component 460, and a feedback component 470.

As one of ordinary skill in the art will appreciate, the depiction of the various functional units in communication facilitation service 410 is for purposes of illustration, as the functional units may be located within the communication facilitation service 410 or elsewhere within and/or between distributed computing components.

In one aspect, the communication correction component 460 may receive, process, and/or filter communications intended for a user using a communication correction operation using the knowledge domain 440 The communication correction component 460 may identify a communication error in one or more selected portions of a communication of a user. The communication correction component 460 may define the communication error as a punctuational error, a sound error, a semantic substitution, a different language, one or more incorrect, incomprehensible, meaningless, repeated, missing words or phrases, or a combination thereof. That is, the communication error may be incorrect speech patterns identified from a user experiencing a cognitive dysfunction and/or impairment (e.g., a neurological syndrome such as, for example, aphasia which is the loss of ability to understand or express speech) in the context of incorrect speech patterns. More specifically, the communication error may be communicated from a user experiencing one or more types of communication challenges, learning difficulties, and/or health related learning and communication disabilities. For example, sensory, perceptual, neurological/cognitive and/or emotional response problems in individuals may be associated with neural dysfunction that may cause the communication error. The communication correction component 460 may classify the communication error into one of a plurality of communication error categories.

By way of example only, the communication error categories may include 1) "paraphasia" which is the use of incorrect words, incorrect pronunciation, or misunderstand/comprehension, 2) "phonemic paraphasia" which are sound errors in speech such as, for example, "gat" used instead of "cat"), 3) "Semantic parazphasias" which is a semantic substitutions, such as saying aunt instead of sister, 4) "circumlocution" which is describing a word that cannot be remembered, 5) "cholalia" which is the repetition of words or phrases said by another person, and/or 6) "verbal stereotypies" which is the repetition of meaningless words or phrases. Other communication error categories/sub-categories may be defined such as, for example, a use of mixed language category/sub-category (e.g., the phrase "Bonjour, my friend," which is the use of a mix of the French language and the English language, etc.), a dialect category/sub-category (e.g., a particular form of a language that is peculiar to a specific region or social group, or other user defined category or sub-categories).

The communication correction component 460 may automatically translate the communication error in the one or more selected portions of the communication. The communication correction component 460 may also provide one or more interpretations for the communication error, and/or provide one or more suggestions to the user providing the communications so as to correct the communication error according to the knowledge domain.

The communication facilitation service 410 may also use a natural language processing ("NLP") operation to convert speech-to-text and/or filter the speech data to modify, adjust, alter, reorganize, interpret and/or translate the speech data into a style, pattern, or suitability appropriate for the recipient of the communication.

In one aspect, the knowledge domain 440 may be a database, which may also be an ontology of concepts representing a domain of knowledge. A thesaurus or ontology may be included in the knowledge domain 440 and may also be used to identify languages (types and rules relating to the language), grammar rules/policies, syntax rules, speech patterns, semantic relationships, and cultural speech patterns/rules/customers, and/or various dialects of a particular region. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, speech data may be translated, interpreted, adjusted, corrected and/or modified using one or more external resources such as, for example, a webpage that may describe, explain, or provide additional information relating to the speech data.

More specifically, the machine learning component 450 may be used to identify the communication error, translate the communication error, learn an appropriateness of the communications for the user according to a knowledge domain, and/or learn and analyze a type of communication error according to one of a plurality of communication error categories. In one aspect, the knowledge domain may include a variety of knowledge data such as, for example, data relating to language skills of a user (e.g., a user if fluent in multiple languages), dialects, cultural speech patterns/habits/accents, communication skills of a user, historical speech patterns, temporal patterns, grammar rules, syntax rules, health state of a user, and/or neural dysfunctions, relating to a plurality of users.

For example, training data that includes communication error classifications, types and samples of language dialects, types and samples of cultural speech patterns/habits/accents, one or more user profiles, historical speech patterns of a user, temporal patterns, grammar rules of a plurality of types of languages, semantic/syntax rules. The training data may be used to build one or more communication models. Additionally, data may be collected, tracked, and/or monitored over a selected period of time of a selected user and/or a group of users, which may be used to enhance the user profile of a user and enhance/update the communication model. The data that is collected, tracked, and/or monitored includes data relating to a health state of the user and/or group of users (e.g., a user experiencing cognitive challenges, etc.), language skills of the user and/or group of users (e.g., ability to speak/communicate/understand multiple languages), communication speed, communication tone, patterns of communication, communication/social skills, neural dysfunction, or other sensory, perceptual, cognitive and/or emotional/behavioral challenges, disabilities, or dysfunctions of the user and/or group of users. Thus, the communication model is generated to learn the "appropriateness" of a particular communication of the user and/or group of users by analyzing current communication and comparing the current communication to the communication model. The trained and learned communication model may be stored in a knowledge domain. The machine learning component 450 may use the communication model to identify the communication error, translate the communication error, learn an appropriateness of the communications for the user according to a knowledge domain, and/or learn and analyze a type of communication error according to one of a plurality of communication error categories.

The feedback component 470 may be used to collect feedback information from the user, an alternative user, or a combination thereof. Also, the feedback component 470 may provide one or more suggestions, interpretations, translations to both the entity providing the communications and entity receiving the communication, so as to modify, translate, interpret, or understand the speech communication.

In view of the foregoing components and functionality of FIG. 4, consider the following example of a user with a cognitive challenge. Assume John Doe's mother, Jane Doe, has been diagnosed with a neural dysfunction. Often, John Doe has trouble communicating with Jane Doe due to various communication difficulties such as, for example, paraphasias and circumlocution. John Doe can understand some of the errors that his mother Jane Does says, but not the majority of speech.

Thus, as Jane Doe communicates to John Doe, the present invention identifies a communication error in one or more selected portions of a communication of Jane Doe, if any. The communication error is automatically translated/interpreted in the one or more selected portions of the communication of Jane Doe. The present invention then communicates the translated/interpreted/corrected speech back to John Doe. It should be noted that the operations of FIG. 4 may occur in real-time or while the person is communicating to another person. As such, as a person is communicating to another person, the present invention (e.g., the components/functionality described in FIG. 4) may be automatically activated/triggered to receive, filter, correct/translate, and/or interpret any communication error and then provide the corrected/translated communication back to the intended user. From the recipient of the speech/communication point of view, there is little to no delay in receiving the communication from the speech provider. In this way, using the cognitive system of FIG. 4, John Doe is able to understand what Jane Doe is saying by increasing the understanding while providing meaningful conversation with Jane Doe.

Thus, the mechanisms of the illustrative embodiments provide for persons with fluency in multiple languages, health challenges, cognitive challenges, sensory, perceptual, cognitive, emotional response challenges, a neural dysfunction, speech disturbances (e.g., dementia, paraphasia, aphasia etc.) and/or person communicating having grammar/syntax errors, sound errors, or other communication challenges causing a diminished capacity to understand a communicating party to communicate by leveraging machine techniques to translate their erroneous speech into normal coherent speech. The cognitive system may monitor and analyze temporal patterns of errors to detect shift in activity and potential decline of a health condition. The cognitive system may also be used as an early diagnostic tool to detect oncoming health conditions and/or other conditions that have speech disturbance.

Figure 5:
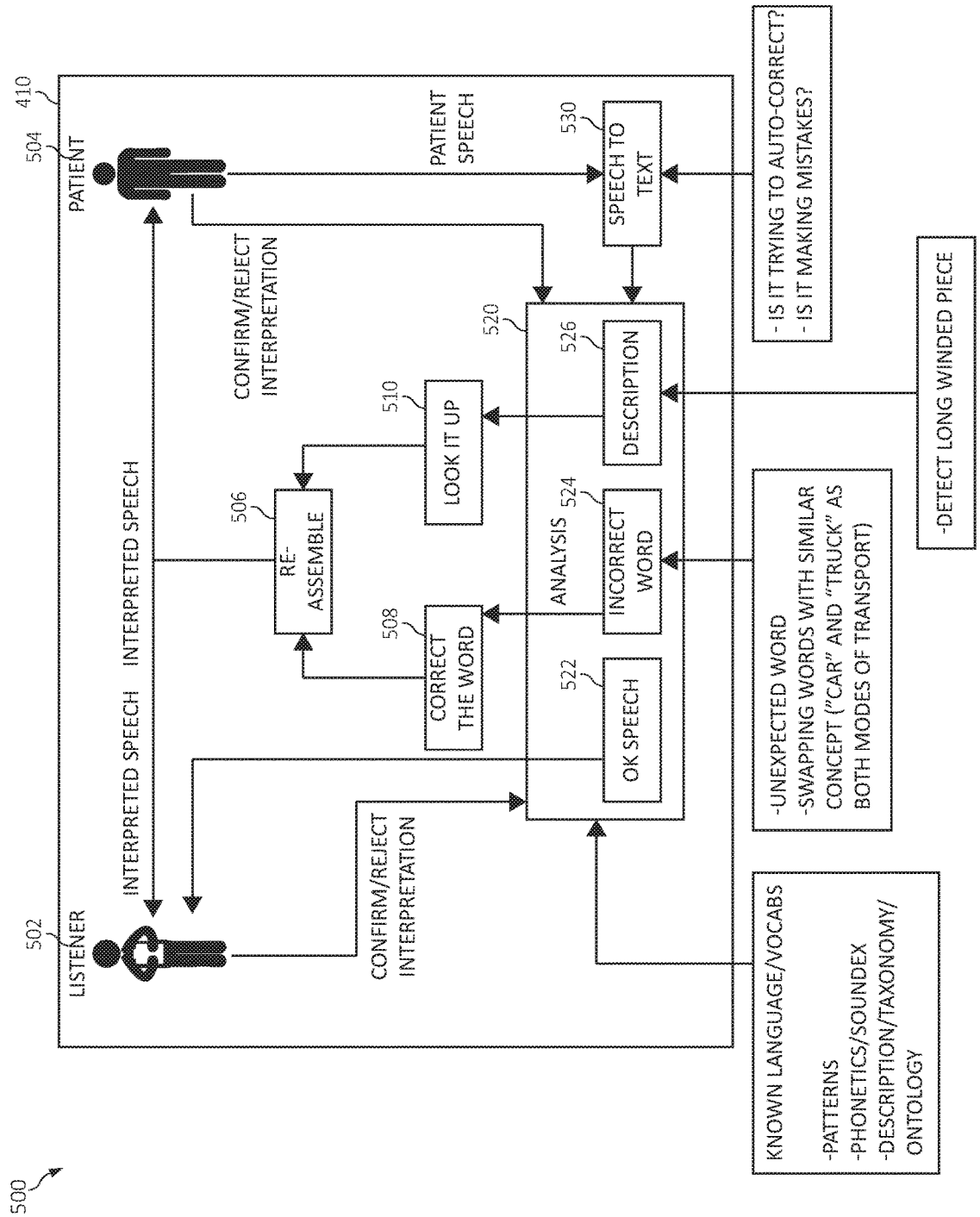
FIG. 5 is a block diagram depicting an exemplary method for intelligent facilitation of communication between a user and another party, in which various aspects of the present invention may be realized.

FIG. 5 is a block diagram 500 depicting an exemplary operation for intelligent facilitation of communication between a user and another party. In one aspect, the functionality, operations, and/or architectural designs of FIGS. 1-4 may be implemented all and/or in part in FIG. 5 such as, for example, the communication facilitation service 410 of FIG. 4.

In operation, a user 502 (e.g., listener 502) may engage in a communication dialog with user 504 (e.g., patient 504). The speech/communication of patient 504 may be captured a natural language processing ("NLP") operation may perform be used such as, for example, performing a speech-to-text operation (e.g., using IBM® Watson® speech to text API), as in block 530.

An analysis operation may analyze the speech/communication of patient 504 (from block 530), as in block 520. During the analysis operation at block 520, a description operation may be performed to detect one or more portions/pieces of the speech data that may exceed a word/phrase threshold (e.g., a "long-winded" piece or words/phrases that are longer than expected according to a knowledge domain/ontology or learned appropriateness of appropriate speech for a particular context), as in block 526. An expectation operation (e.g., incorrect word operation and/or incorrect phrase operation) may be performed such as, for example, by determining whether the words/phrases are expected or unexpected, and also determining whether words/phrases have been swapped/changed with similar concepts (e.g., "car" and "truck" as both are modes of transportation), as in block 524. A validation operation may be performed to determine a correctness of the speech (e.g., is the speech "ok") such as, for example, using a knowledge domain/ontology (e.g., with known language and/or vocabulary), as in block 522. That is, the knowledge domain/ontology may be accessed and utilized to determine the correctness of words/phrases of the speech of the patient 504 using one or more speech patterns, phonetics/soundex (e.g., phonetically encodes text elements (e.g.: words)) into Soundex terms based on the pronunciation of each text element), descriptions, taxonomy, and/or ontology. In one aspect, a soundex operation may convert a text word to a short alphanumeric string (e.g., a "Soundex term"), and/or convert two words having the same first letter and that sound alike to the same Soundex term.

As illustrated, to assist with block 526, a look up operation may be performed, as in block 510. In one aspect, the look up operation may be an operation to check a data store (e.g., a knowledge domain having an ontology and/or dictionary) of descriptions of objects. In this way, if a user describes an object (e.g., because the user may not be recall the actual word for the object), the look up operation may search/check the data store and determine if there is a similar or matching description and, if so, the actual word for the object being described may be retrieved (which would also be in the "dictionary") and used to replace the description with the actual word they user is attempting to say.

Based on the analysis operation from block 520, one or more parts of the speech may be corrected (e.g., correct a word or phrase), as in block 508. In block 506, using the data from blocks 508 and 510, a reassemble operation may be performed to reassemble, interpret, suggest, and/or translate the speech/communication of patient 504 (e.g., interpreted speech/communication of patient 504) according to the analysis operation from block 520. The interpreted speech/communication of patient 504, which has been reassembled, interpreted, suggested, and/or translated, may be provided back to the user 502 and/or the patient 504. Both the user 502 and the patient 504 may provide feedback to confirm and/or reject the interpreted speech/communication of patient 504.

Figure 6:
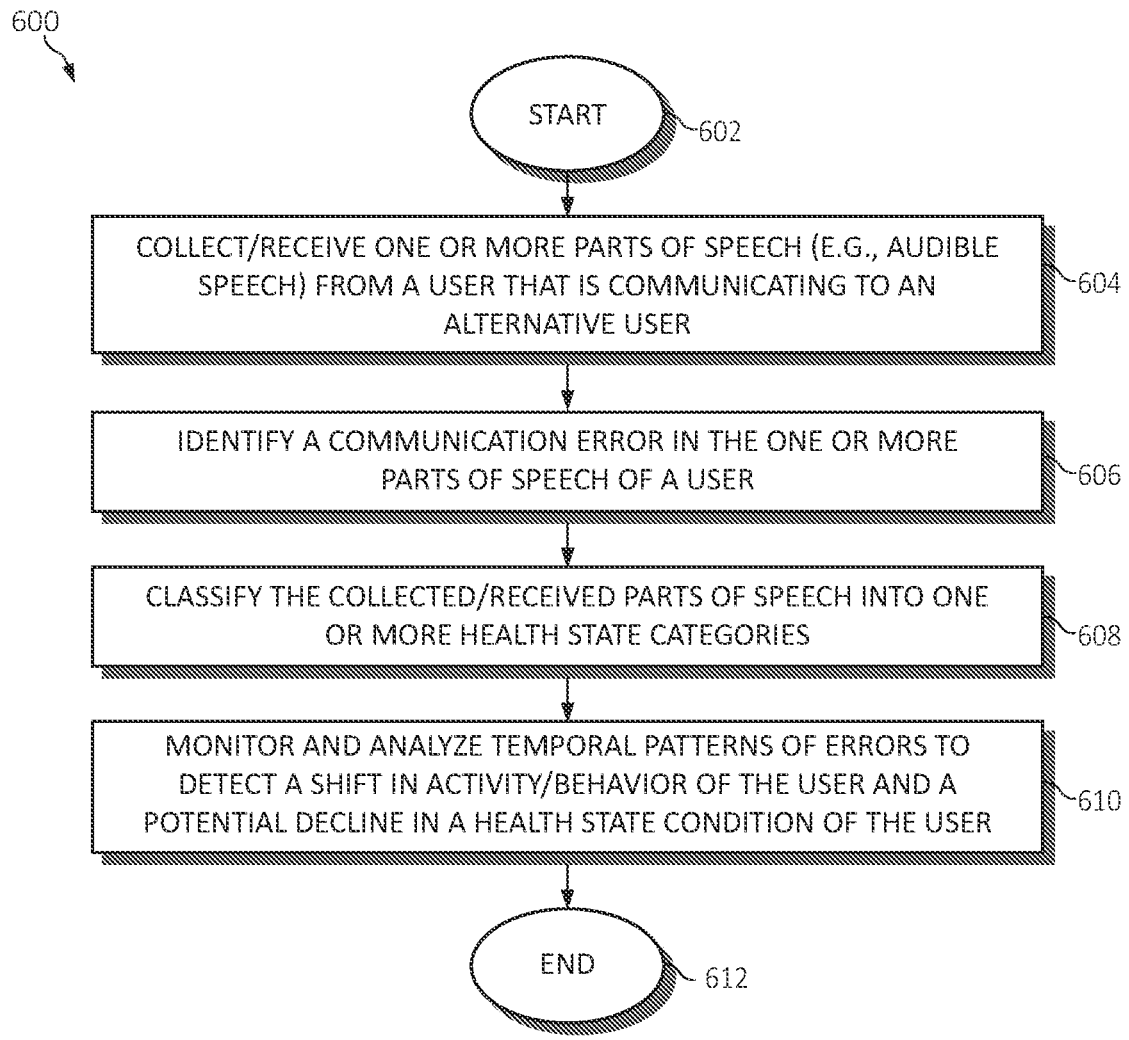
FIG. 6 is a flowchart diagram depicting an exemplary method for intelligent facilitation of communication in which various aspects of the present invention may be realized.

Turning now to FIG. 6 a method 600 for implementing intelligent facilitation of communication using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 6.

The functionality 600 may start in block 602. One or more parts of speech (e.g., audible speech) may be collected/detected from a user that is communicating to an alternative user, as in block 604. A communication error may be identified in the one or more parts of speech of a user, as in block 606. The collected/received parts of speech may be classified into one or more health state categories, as in block 608. One or more possible interpretations of the communication may be provided, as in block 610. Temporal patterns of errors may be monitored and analyzed to detect a shift in activity/behavior of the user and a potential decline in a health state condition of the user, as in block 612. The functionality 600 may end, as in block 614.

Figure 7:
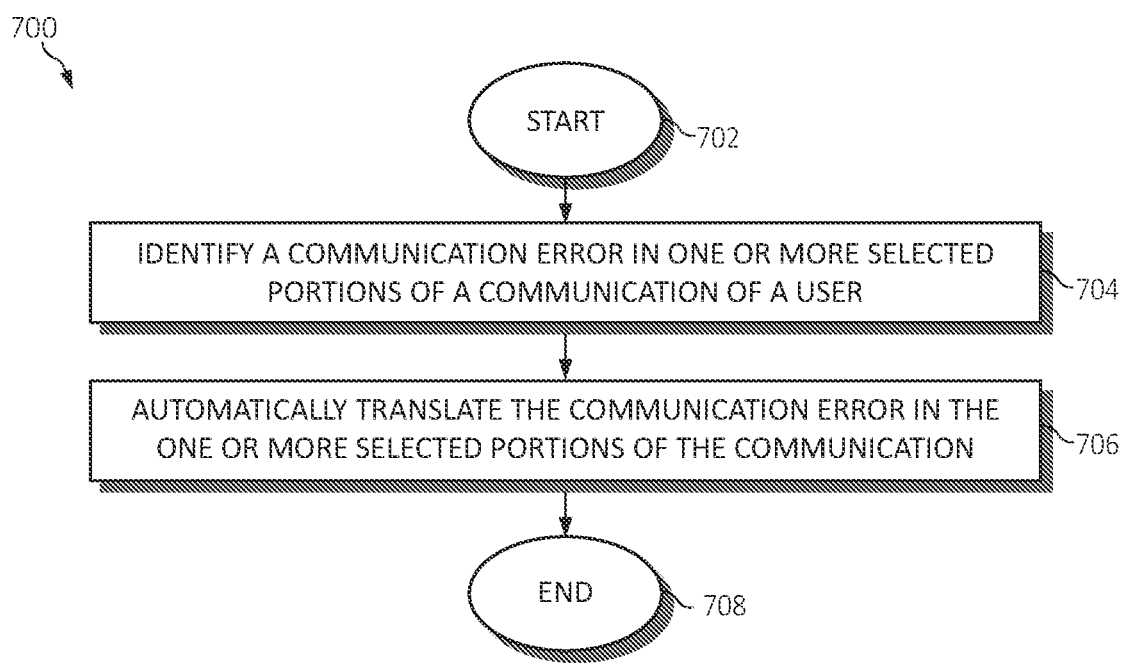
FIG. 7 is a flowchart diagram depicting an exemplary method for intelligent facilitation of communication in which various aspects of the present invention may be realized.

Turning now to FIG. 7, a method 700 for implementing intelligent facilitation of communication using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 7.

The functionality 700 may start in block 702. A communication error in one or more selected portions of a communication of a user may be identified (e.g., a communication error identified from a communication from a user having one or more neurological syndrome such as, for example, aphasia which is the loss of ability to understand or express speech), as in block 704. The communication error in the one or more selected portions of the communication may be automatically translated, as in block 706. The functionality 700 may end, as in block 708.

In one aspect, in conjunction with and/or as part of at least one block of FIG. 7, the operations of method 700 may include each of the following. The operations of method 700 may provide one or more interpretations for the communication error, and/or provide one or more suggestions to the user providing the communications so as to correct the communication error according to a knowledge domain.

The operations of method 700 may classify the communication error into one of a plurality of communication error categories. The operations of method 700 may define the communication error as a punctuational error, a sound error, a semantic substitution, a different language, one or more incorrect, incomprehensible, meaningless, repeated, missing words or phrases, or a combination thereof.

The operations of method 700 may monitor the communication to detect a change in one or more contextual factors, a communication style, a communication tone, a speed of communication, communication patterns, or a combination thereof for detecting the communication error. A machine learning mechanism may be initialized for identifying the communication error, translating the communication error, learning an appropriateness of the communications for the user according to a knowledge domain, and/or learning and analyzing a type of communication error according to one of a plurality of communication error categories.

Figure 8:
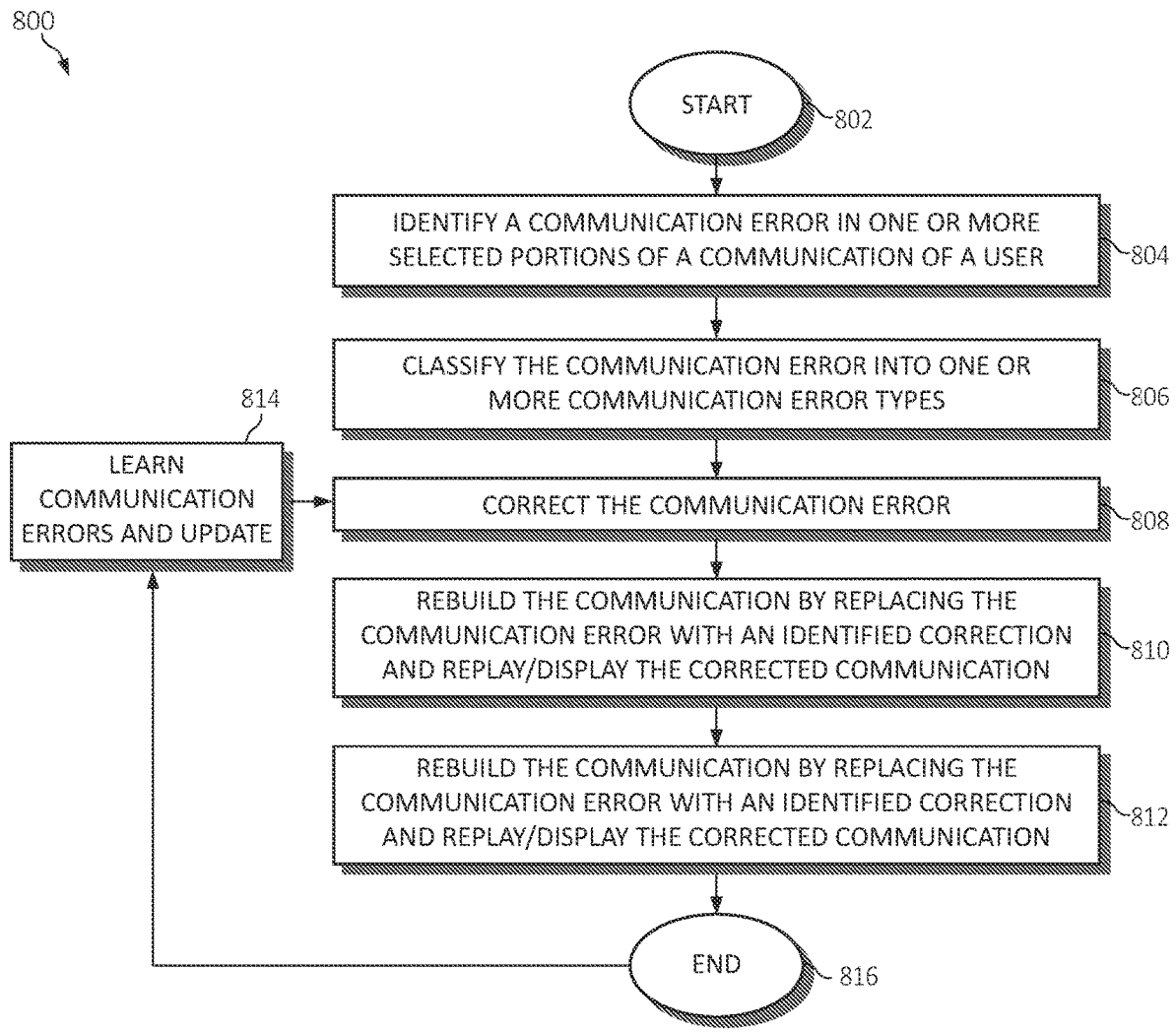
FIG. 8 is a flowchart diagram depicting an additional exemplary method for implementing intelligent facilitation of communication using a machine learning operation, again in which various aspects of the present invention may be realized.

Turning now to FIG. 8, a method 800 for implementing intelligent facilitation of communication using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 8.

The functionality 800 may start in block 802. A communication error in one or more selected portions of a communication of a user may be identified, as in block 804. The communication error may be classified into one or more communication error types (e.g., a semantic error, a description of an intended word, etc.), as in block 806. The communication error may be corrected using one or more types of operations such as, for example, a machine learning model, as in block 808. The communication may be rebuilt by replacing the communication error with an identified correction and the corrected communication may be replayed/displayed, as in block 810. Feedback may be gained (e.g., collected, received, learned, etc.) from one or more users on accuracy of the corrected communication, as in block 812. From block 812, feedback may be used to learn, correct, update, the communication errors and each machine learning model, as in block 814. The functionality 800 may end, as in block 816.

Figure 9:
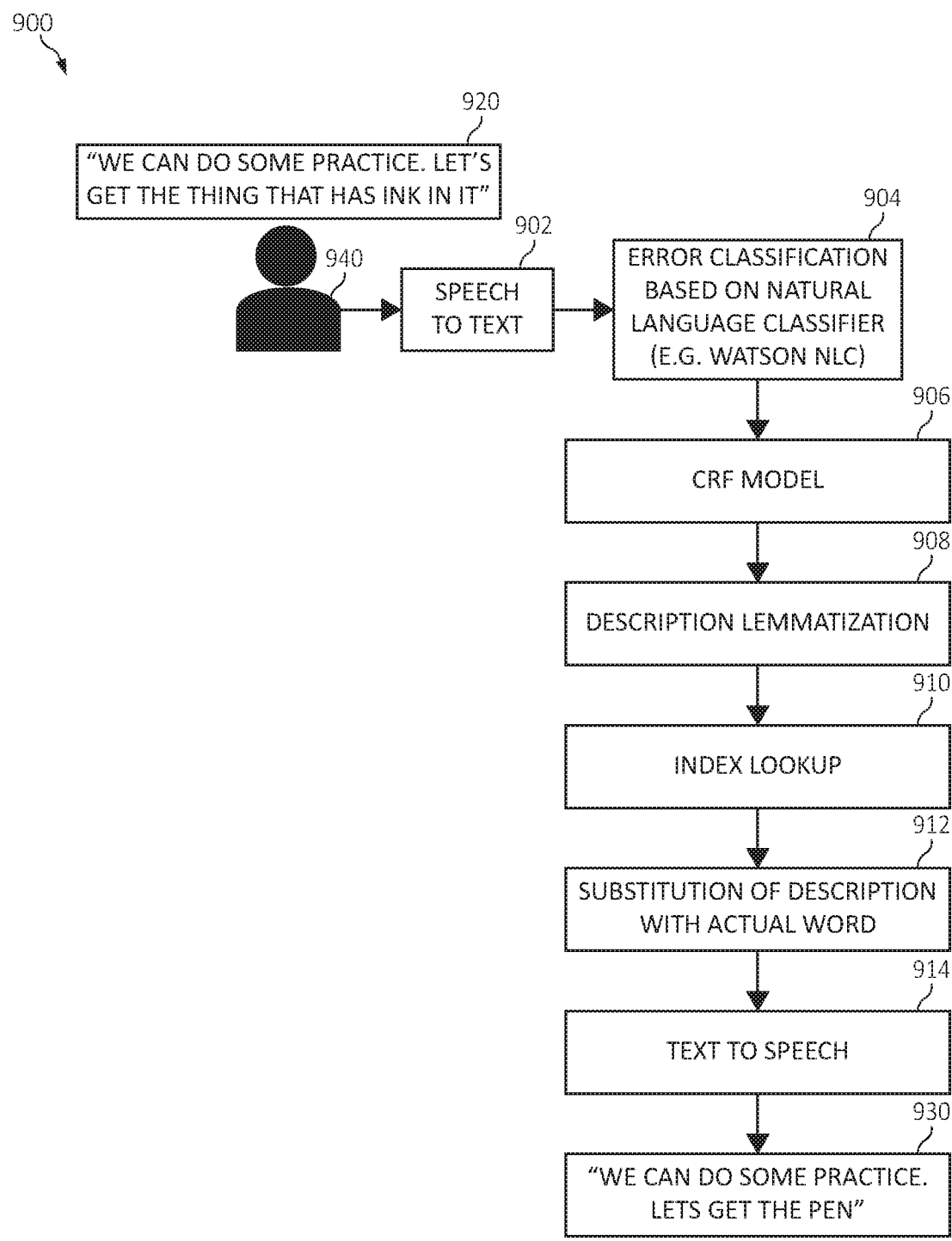
FIG. 9 is a flowchart diagram depicting an additional exemplary method for intelligent facilitation of communication, again in which various aspects of the present invention may be realized.

Turning now to FIG. 9, a method 900 for implementing intelligent facilitation of communication using a machine learning operation using one or more computing processors is depicted, in which various aspects of the illustrated embodiments may be implemented. The functionality 900 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 9.

The functionality 900 may start with a user 940 may communicate a message/speech such as, for example, the audible communication 920 "We can do some practice. Let's get the thing that has ink in it" and the message/speech may be processed and/or converted (via artificial intelligence (e.g., "speech to text" conversion) such as, for example, an NLP operation and/or machine learning operation) to text data, as in block 902. An error classification operation may be performed (via an NLP classifier/machine learning machine learning component 450 of FIG. 4) to classify a detected communication error, as in block 904. For example, the communication may be categorized as circumlocution (e.g., the user of many words to express an idea when fewer words would do).

A conditional random field ("CRF") model may be trained on a text corpus with descriptions in the text being annotated and the phrase "the thing that has in it" is extracted from the text, as in block 906. A description lemmatization operation may be performed and create a standard form off of the description, as in block 908.

An index look up operation may lookup index of lemmatized descriptions of words with each description annotate with the word being described and a fuzzy matching operation may be used to identify a best/closest matched description (as compared to other matching descriptions) and the corresponding annotations on the best/closest matched description may be used such as, for example, the word "pen" is the closest match, as in block 910. The description (e.g., "the thing that may have ink in it") may be substituted with the actual word (e.g., "pen"), as in block 912. In block 914, the text data may then be converted back to speech/audible data (or visual data) (e.g., "text to speech" conversion) such as, for example the audible communication 930 "We can do some practice. Let's get the pen."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent facilitation of communication by a processor, comprising:
    identifying a communication error in one or more selected portions of a communication of a user, wherein the communication error is identified from categories of communication errors, the categories including at least: phonemic paraphasia, semantic paraphasia, circumlocution, echolalia, verbal stereotypy, mixed language, and dialect; and
    automatically translating the communication error from one or more of the identified categories in the one or more selected portions of the communication.

2. The method of claim 1, further including:
    providing one or more interpretations for the communication error; or
    providing one or more suggestions to the user providing the communications so as to correct the communication error according to a knowledge domain.

3. The method of claim 1, further including classifying the communication error into one of a plurality of communication error categories.

4. The method of claim 1, further including defining the communication error as a punctuational error, a sound error, a semantic substitution, a different language, one or more incorrect, incomprehensible, meaningless, repeated, missing words or phrases, or a combination thereof from the user experiencing a decline in a neurological state.

5. The method of claim 1, further including monitoring the communication to detect a change in one or more contextual factors, a communication style, a communication tone, a speed of communication, communication patterns, a health state of the user, or a combination thereof for detecting the communication error.

6. The method of claim 1, further including initializing a machine learning mechanism for:
   identifying the communication error;
   translating the communication error;
   learning an appropriateness of the communications for the user according to a knowledge domain; and
   learning and analyzing a type of communication error according to one of a plurality of communication error categories.

7. The method of claim 1, further including collecting feedback information from the user or an alternative user during a dialog between the user and the alternative user.

8. A system for intelligent facilitation of communication, comprising:
   one or more computers with executable instructions that when executed cause the system to:
      identify a communication error in one or more selected portions of a communication of a user, wherein the communication error is identified from categories of communication errors, the categories including at least: phonemic paraphasia, semantic paraphasia, circumlocution, echolalia, verbal stereotypy, mixed language, and dialect; and
      automatically translate the communication error from one or more of the identified categories in the one or more selected portions of the communication.

9. The system of claim 8, wherein the executable instructions:
   provide one or more interpretations for the communication error; or
   providing one or more suggestions to the user providing the communications so as to correct the communication error according to a knowledge domain.

10. The system of claim 8, wherein the executable instructions classify the communication error into one of a plurality of communication error categories.

11. The system of claim 8, wherein the executable instructions define the communication error as a punctuational error, a sound error, a semantic substitution, a different language, one or more incorrect, incomprehensible, meaningless, repeated, missing words or phrases, or a combination thereof from the user experiencing a decline in a neurological state.

12. The system of claim 8, wherein the executable instructions monitor the communication to detect a change in one or more contextual factors, a communication style, a communication tone, a speed of communication, communication patterns, a health state of the user, or a combination thereof for detecting the communication error.

13. The system of claim 8, wherein the executable instructions initialize a machine learning mechanism for:
   identifying the communication error;
   translating the communication error;
   learning an appropriateness of the communications for the user according to a knowledge domain; and
   learning and analyzing a type of communication error according to one of a plurality of communication error categories.

14. The system of claim 8, wherein the executable instructions collect feedback information from the user or an alternative user during a dialog between the user and the alternative user.

15. A computer program product for intelligent facilitation of communication by a processor, the computer program product comprising a non-transitory computer-readable storage medium having computer-readable program code portions stored therein, the computer-readable program code portions comprising:
   an executable portion that identifies a communication error in one or more selected portions of a communication of a user, wherein the communication error is identified from categories of communication errors, the categories including at least: phonemic paraphasia, semantic paraphasia, circumlocution, echolalia, verbal stereotypy, mixed language, and dialect; and
   an executable portion that automatically translates the communication error from one or more of the identified categories in the one or more selected portions of the communication.

16. The computer program product of claim 15, further including an executable portion that:
   provides one or more interpretations for the communication error; or
   provides one or more suggestions to the user providing the communications so as to correct the communication error according to a knowledge domain.

17. The computer program product of claim 15, further including an executable portion that:
   classifies the communication error into one of a plurality of communication error categories; or
   defines the communication error as a punctuational error, a sound error, a semantic substitution, a different language, one or more incorrect, incomprehensible, meaningless, repeated, missing words or phrases, or a combination thereof.

18. The computer program product of claim 15, further including an executable portion that monitors the communication to detect a change in one or more contextual factors, a communication style, a communication tone, a speed of communication, communication patterns, a health state of the user, or a combination thereof.

19. The computer program product of claim 15, further including an executable portion that:
   identifies the communication error;
   translates the communication error;
   learns an appropriateness of the communications for the user according to a knowledge domain; and
   learns and analyzes a type of communication error according to one of a plurality of communication error categories.

20. The computer program product of claim 15, further including an executable portion that collects feedback information from the user or an alternative user during a dialog between the user and the alternative user.

* * * * *